US010953717B2

(12) United States Patent
Ricketts et al.

(10) Patent No.: US 10,953,717 B2
(45) Date of Patent: Mar. 23, 2021

(54) WEAR MITIGATED DAMPER ASSEMBLY FOR A VEHICLE

(71) Applicant: Honda Motor Co., Ltd., Tokyo (JP)

(72) Inventors: Brandon E. Ricketts, Marysville, OH (US); Justin A. Newton, Marysville, OH (US); Dustin M. Schroeder, Milford Center, OH (US); Jeremy T. McGuire, Powell, OH (US)

(73) Assignee: Honda Motor Co., Ltd., Tokyo (JP)

( * ) Notice: Subject to any disclaimer, the term of this patent is extended or adjusted under 35 U.S.C. 154(b) by 93 days.

(21) Appl. No.: 16/410,140

(22) Filed: May 13, 2019

(65) Prior Publication Data
US 2020/0361267 A1    Nov. 19, 2020

(51) Int. Cl.
*B60G 15/06*    (2006.01)

(52) U.S. Cl.
CPC ......... *B60G 15/063* (2013.01); *B60G 15/065* (2013.01); *B60G 2202/312* (2013.01); *B60G 2204/1242* (2013.01); *B60G 2206/7102* (2013.01); *B60G 2206/72* (2013.01); *B60G 2206/80* (2013.01); *B60G 2800/162* (2013.01)

(58) Field of Classification Search
CPC ................ B60G 15/063; B60G 15/065; B60G 2206/72; B60G 2206/80; B60G 2206/7102; B60G 2202/312; B60G 2204/1242; B60G 2800/162; B60G 17/021; F16F 9/14; F16F 3/00
See application file for complete search history.

(56) References Cited

U.S. PATENT DOCUMENTS

| 2,902,274 | A | * | 9/1959 | McIntyre | ............. | B60G 15/063 |
| | | | | | | 267/225 |
| 5,263,695 | A | * | 11/1993 | Bianchi | .................. | B60G 11/32 |
| | | | | | | 267/225 |
| 6,076,814 | A | * | 6/2000 | Grundei | ............... | B60G 15/065 |
| | | | | | | 188/315 |
| 6,293,533 | B1 | * | 9/2001 | Sasse | .................. | B60G 13/008 |
| | | | | | | 267/175 |
| 6,676,119 | B2 | | 1/2004 | Becker et al. | | |
| 6,902,045 | B2 | | 6/2005 | Oliver et al. | | |
| 7,237,780 | B2 | * | 7/2007 | Ohki | ..................... | B60G 11/14 |
| | | | | | | 280/124.165 |

(Continued)

FOREIGN PATENT DOCUMENTS

| CN | 201293063 Y | 8/2009 |
| CN | 201747853 U | 2/2011 |

(Continued)

*Primary Examiner* — Vishal R Sahni
(74) *Attorney, Agent, or Firm* — American Honda Motor Co., Inc.; Clifford B Vaterlaus

(57) ABSTRACT

A damper assembly for a vehicle which includes a damper body, a first ring element, and a spring coupler. The damper body includes a threaded portion which extends between a first end and a second end of the damper body. The first ring element is disposed within a first groove in the threaded portion. The spring coupler having a passage to concentrically receive the damper body such that the spring coupler is configured to slide over the first ring element. The first ring element is disposed within the first groove of the threaded portion such that a sliding clearance is provided between an inner portion of the spring coupler and the threaded portion.

20 Claims, 3 Drawing Sheets

(56) References Cited

U.S. PATENT DOCUMENTS

| | | |
|---|---|---|
| 8,205,864 B2 | 6/2012 | Michel |
| 8,770,593 B2 | 7/2014 | Moore et al. |
| 8,844,943 B2 | 9/2014 | Kim et al. |
| 2002/0038929 A1* | 4/2002 | Now .................... B60G 15/065 267/217 |
| 2006/0213733 A1 | 9/2006 | Masaki |
| 2010/0308518 A1* | 12/2010 | Michel ................. B60G 17/021 267/218 |
| 2015/0290992 A1* | 10/2015 | Mochizuki ................ F16F 9/46 280/5.514 |
| 2017/0253102 A1* | 9/2017 | Mason .................... B62K 25/04 |
| 2017/0334260 A1* | 11/2017 | Huang ................. B60G 15/063 |
| 2017/0369098 A1* | 12/2017 | Urbanski ................... F16F 9/54 |
| 2019/0176558 A1* | 6/2019 | Renn ................. B60G 17/0272 |

FOREIGN PATENT DOCUMENTS

| | | |
|---|---|---|
| DE | 102007004747 A1 | 8/2008 |
| WO | 2009033985 A1 | 3/2009 |
| WO | 2017140441 A1 | 8/2017 |
| WO | 2018177666 A1 | 10/2018 |

\* cited by examiner

WEAR MITIGATED DAMPER ASSEMBLY FOR A VEHICLE

BACKGROUND

Currently, vehicle suspensions utilize damper assemblies for damping vibrations which may be caused by road/terrain irregularities. These damper assemblies typically are designed with a single coil spring circumferentially disposed around a damper body. In certain conventional solutions, for example all-terrain vehicles (ATV), the damper assemblies may employ dual coil springs which are circumferentially disposed above one another in series around the damper body and are coupled with each other using a spring coupler. Such damper assemblies are known as a dual rate damper assembly because each of the dual coil springs may have different spring rates, number of coils and lengths.

Conventionally, the spring coupler is designed to withstand the forces and adequately support the dual coil springs in different terrains. However, in certain situations, the terrain forces may be of high magnitude due to which the spring coupler may deform or may come in contact with the damper body. This may lead to damage of the damper body material which further may lead to loss of damper fluid and overall strength of the damper assembly. In certain other situations, due to dirty, muddy, or sandy conditions, debris may occur between the spring coupler and the damper body, which may also wear or damage the body of the damper body. Such damages may require replacement of the damper body which may be cost in-effective or time-consuming. Therefore, an improved wear mitigation arrangement for the damper assembly may be required.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

An exemplary aspect of the disclosure provides a damper assembly for a vehicle. The damper assembly for the vehicle may include a damper body, a first ring element and a spring coupler. The damper body may include a threaded portion which extends between a first end and second end of the damper body. The first ring element may be disposed within a first groove in the threaded portion. The spring coupler may have a passage to concentrically receive the damper body such that the spring coupler may be configured to slide over the first ring element. The first ring element may be disposed within the first groove such that a sliding clearance may be provided between an inner portion of the spring coupler and the threaded portion of the damper body.

Another exemplary aspect of the disclosure provides a damper assembly for a vehicle that may include a damper body, a plurality of grooves, at least one ring element and a spring coupler. The damper body may include a cylindrical external surface and a longitudinal axis. The plurality of grooves may be formed in the cylindrical external surface and the grooves may be spaced apart perpendicular to the longitudinal axis. The at least one ring element may be removably disposed in one of the plurality of grooves. The spring coupler may include a passage to concentrically receive the damper body. The spring coupler may further comprise a flanged portion that may be configured to support a first coil spring and a second coil spring. The at least one ring element may contact an inner portion of the spring coupler to provide a sliding clearance between the inner portion of the spring coupler and the cylindrical external surface of the damper body.

Another exemplary aspect of the disclosure provides a method for assembly of a damper assembly. In the exemplary method, a first ring element may be disposed in a first groove of a threaded portion of a damper body. The threaded portion may extend between a first end and a second end of the damper body. A spring coupler may be disposed concentrically around the damper body such that the spring coupler may be configured to slide over the first ring element. The first ring element may be disposed within the first groove such that a sliding clearance may be provided between an inner portion of the spring coupler and the threaded portion. The first ring element may be replaced when the first ring element is worn.

This summary is provided to introduce a selection of concepts in a simplified form that are further disclosed in the detailed description of the present disclosure. This summary is not intended to identify key or essential inventive concepts of the claimed subject matter, nor is it intended for determining the scope of the claimed subject matter.

Figure 1:
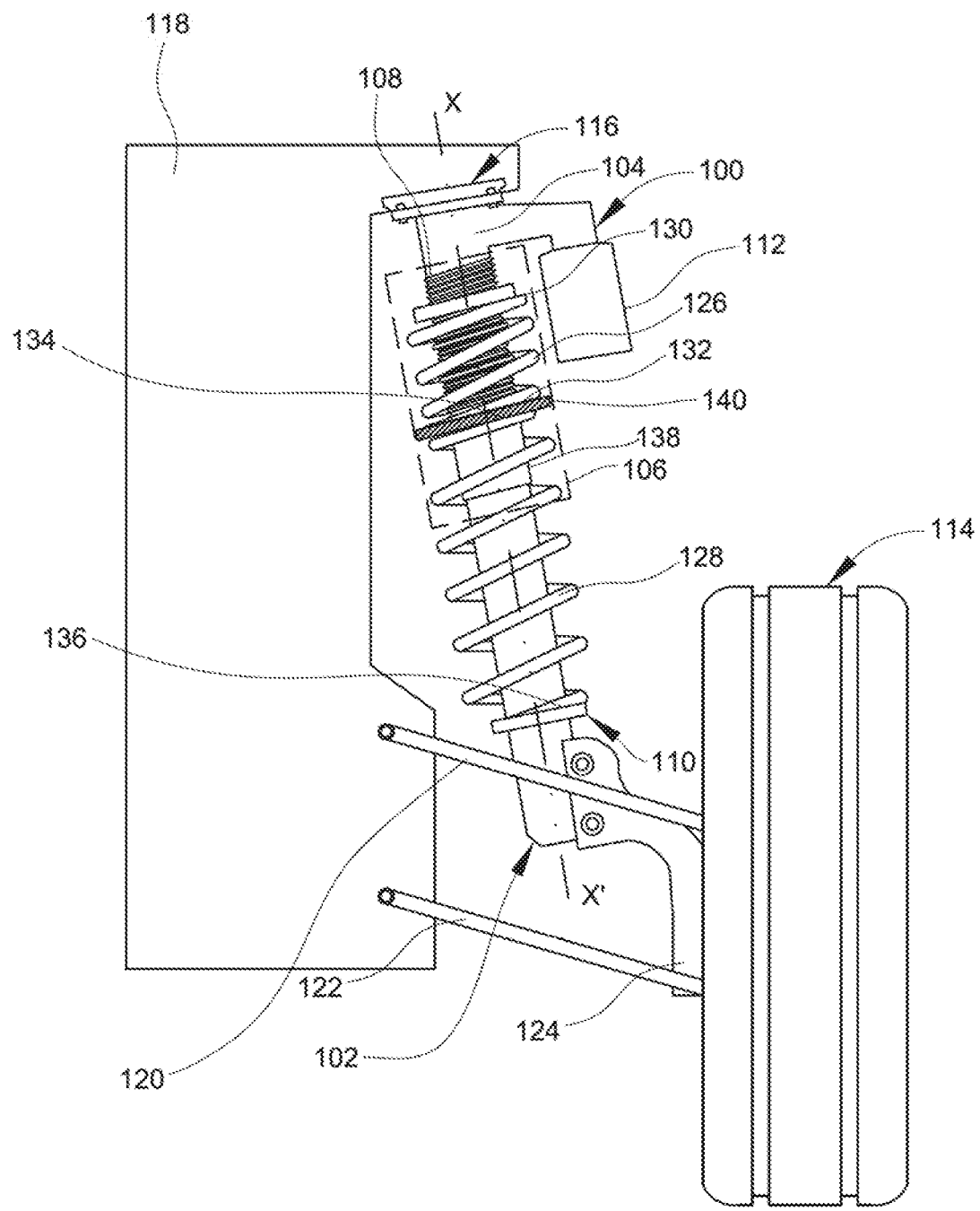
FIG. 1 illustrates a first perspective view of a damper assembly installed in a vehicle suspension, in accordance with an embodiment of the disclosure.

The foregoing summary, as well as the following detailed description of the present disclosure, is better understood when read in conjunction with the appended drawings. For the purpose of illustrating the present disclosure, exemplary constructions of the preferred embodiment are shown in the drawings. However, the present disclosure is not limited to the specific methods and structures disclosed herein. The description of a method step or a structure referenced by a numeral in a drawing is applicable to the description of that method step or structure shown by that same numeral in any subsequent drawing herein.

DETAILED DESCRIPTION

The present disclosure relates to a damper assembly for a vehicle. The disclosed damper assembly aims to prevent damages to a threaded portion extending between a first end and a second end of a damper body. The disclosed damper assembly may include a first ring element disposed in a first groove in the threaded portion due to which a spring coupler of the damper assembly may have a passage to concentrically receive the damper body such that the spring coupler is configured to slide over the first ring element. The first ring element may be disposed within the first groove such that a sliding clearance may be provided between an inner portion of the spring coupler and threaded portion of the damper body. The sliding clearance may prevent the spring coupler from contacting the threaded portion of the damper body. Thus, the disclosed damper assembly may mitigate the wear or damages to the damper body which may occur with the contacts between the spring coupler and the threaded portion of the damper body. The achieved mitigation using the first ring element may further reduces a need as well cost to replace the damaged damper body substantially.

Reference will now be made in detail to specific aspects or features, examples of which are illustrated in the accompanying drawings. Wherever possible, corresponding or similar reference numbers will be used throughout the drawings to refer to the same or corresponding parts.

Figure 2A:
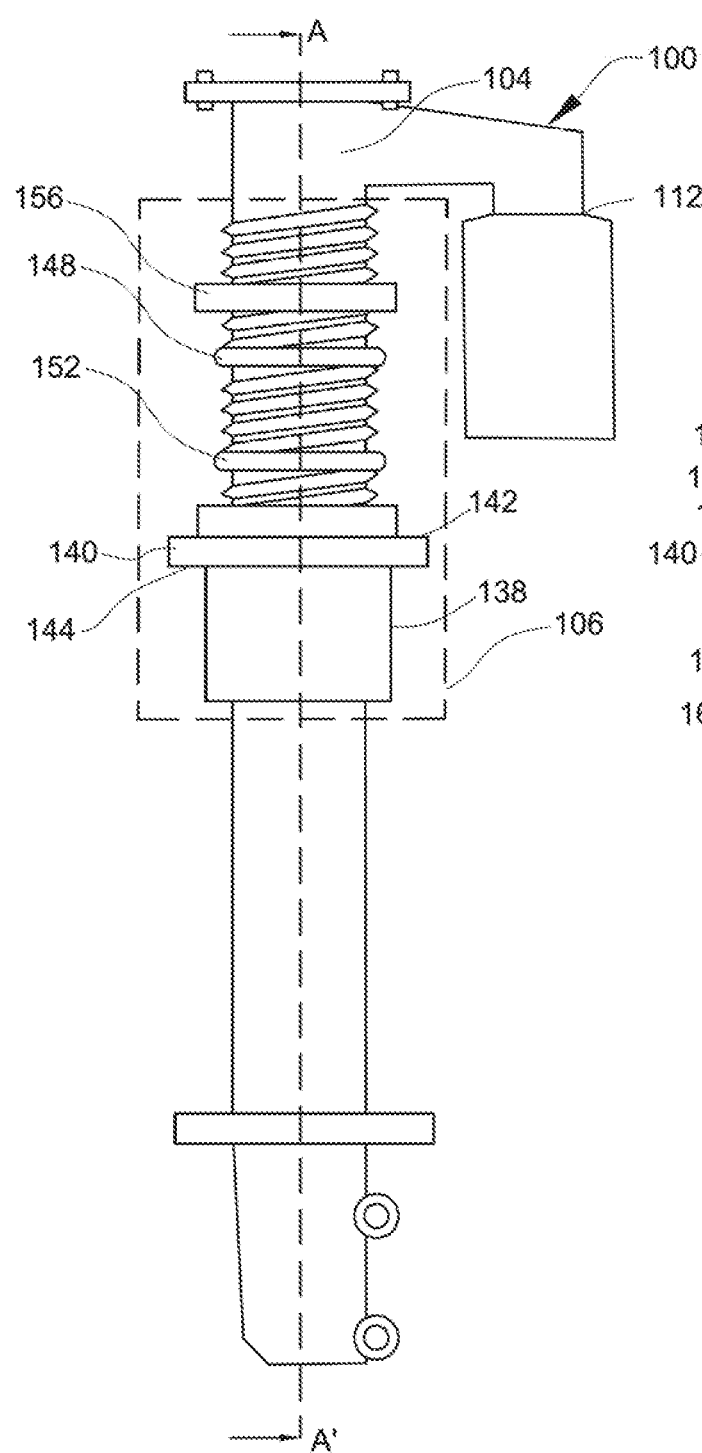
FIG. 2A illustrates a second perspective view of a damper assembly of FIG. 1, in accordance with an embodiment of the disclosure.
Figure 2B:
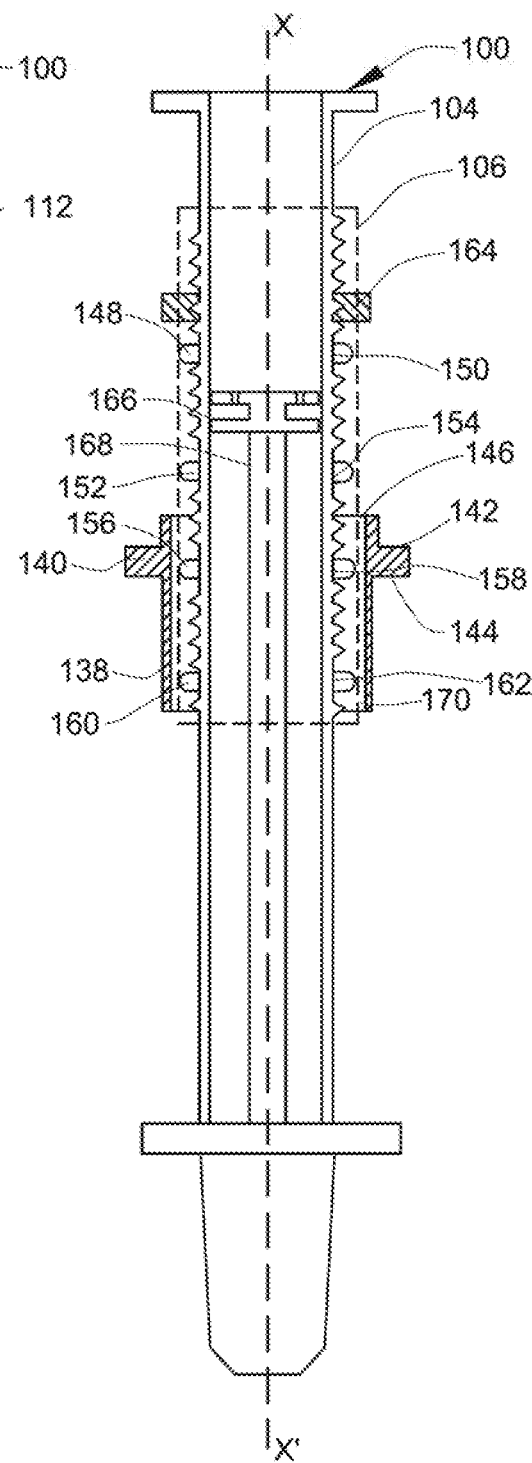
FIG. 2B illustrates a sectional side view of the damper assembly of FIG. 2A, in accordance with an embodiment of the disclosure.

FIG. 1 illustrates a first perspective view of a damper assembly 100 installed in a vehicle suspension 102, in accordance with an embodiment of the disclosure. In FIG. 1, there is shown a damper assembly 100. The damper assembly 100 may be a part of the vehicle suspension 102. The vehicle suspension 102 may be a wishbone arm type suspension (such as a double wishbone/single wishbone type independent suspensions). The damper assembly 100 may include a damper body 104 which may further include a threaded portion 106 which may extend between a first end 108 of the damper body 104 and a second end 110 of the damper body 104. The damper assembly 100 may further include a first ring element (for example first ring element 148 as shown in FIGS. 2A and 2B) and a spring coupler 138. The first ring element 148 may be disposed within a first groove (for example first groove 150 as shown in FIG. 2B) in the threaded portion 106 of the damper body 104.

In some embodiments, the threaded portion 106 may be provided on the damper body 104 by a mechanical thread cutting process (such as screw machining/thread milling or thread grinding) resulting in single point threading or a multiple point threading. The first groove 150 formed in the threaded portion 106 may extend substantially perpendicular to a longitudinal axis X-X' of the damper body 104. The first groove 150 may be formed on an external surface of the damper body 104. The damper body 104 may substantially be a cylindrical tube that may be configured to contain a damper fluid.

The damper body 104 may include a fluid cylinder 112 which may contain the damper fluid (not shown) either in a gaseous state or a liquidized state. The damper fluid may work as a medium for dampening forces received at a wheel 114 of the vehicle during the movement. As shown in FIG. 1, the fluid cylinder 112 may be attached to the first end 108 of the damper body 104. The damper body 104 and the fluid cylinder 112 may be made of a material that may include a metal or a metallic alloy. In some embodiments, the material may be, but is not limited to, steel, aluminum or magnesium. The cylindrical shapes of the damper body 104 and the fluid cylinder 112 as shown in FIG. 1 is merely an example. However, different shapes may be applicable to the damper body 104 and the fluid cylinder 112, without departure from the scope of the disclosure.

In FIG. 1, there is further shown a vehicle suspension mounting portion 116 of the vehicle. The first end 108 of the damper body 104 may be detachably connected to the vehicle suspension mounting portion 116. The vehicle suspension mounting portion 116 may be detachably connected to the first end 108 of the damper body 104 by use of a threaded bolts/rivets or mounts. The vehicle suspension mounting portion 116 may be a part of a vehicle chassis 118. The vehicle suspension mounting portion 116 may be a reinforced portion made from, but is not limited to, a high strength steel, an ultra high-strength steel, or carbon reinforced polymer type materials.

As shown in FIG. 1, the vehicle suspension 102 may include an upper arm 120 and a lower arm 122. The upper arm 120 and the lower arm 122 of the vehicle suspension 102 may be configured to control the movement of the wheel 114. In some embodiments, the upper arm 120 and the lower arm 122 of the vehicle suspension 102 may differ in shapes. The upper arm 120 and the lower arm 122 may be made from a material that may include, but is not limited to, aluminum, steel, or carbon-reinforced polymer structure. As shown in FIG. 1, the upper arm 120 and the lower arm 122 may be detachably and rotatably connected to a knuckle 124 by use of threaded bolts/metallic bushes or mounts. The knuckle 124 may be detachably attached to a steering rod (not shown) configured to change the direction of movement of the wheel 114. The knuckle 124 may be a casted or machined component made of one of a metallic material or a metallic alloy. During the movement of the vehicle, the wheel 114 may move upwards and downwards about a mounting point of the upper arm 120 and a mounting point of the lower arm 122 to a defined movement. The defined movement may compress the damper assembly 100 between the lower arm 122 and the vehicle suspension mounting portion 116. Compression of the damper assembly 100 between the lower arm 122 and the vehicle suspension mounting portion 116 damps forces which may be received on the wheel 114 during the movement of the vehicle on a terrain. With the damper assembly 100 operatively mounted between the lower arm 122 and the vehicle suspension mounting portion 116, the vehicle body is resiliently supported or suspended when the road irregularities (such as bumps, potholes etc) are encountered by the wheel 114 and transferred to the damper assembly 100.

In FIG. 1, there is further shown a first coil spring 126 and a second coil spring 128 that may be disposed concentrically about the longitudinal axis X-X' between the first end 108 and the second end 110 of the damper body 104. The first coil spring 126 and the second coil spring 128 may be made of a metallic material or a metallic alloy. In some embodiments, the first coil spring 126 may have a first spring constant and the second coil spring 128 may have a second spring constant different from the first spring constant. The first coil spring 126 may include a first end 130 and a second end 132 as shown in FIG. 1. Similarly, the second coil spring 128 may also include a first end 134 and a second end 136. In some embodiments, the first coil spring 126 and the second coil spring 128 may have different number of coils. The first end 130 and the second end 132 of the first coil spring 126 may be provided with a flattened surface for adequate support during compression of the damper assembly 100. Similarly, the first end 134 and the second end 136 of the second coil spring 128 may be provided with a flattened surface for adequate support during the compression of the damper assembly 100.

In some embodiments, both the first coil spring 126 and the second coil spring 128 may compress together during the movement of the wheel 114 on a road surface. During a situation of lesser compression at the damper assembly 100, the second spring constant of the second coil spring 128 may provide support for damping lesser forces received at the wheel 114. During another situation of higher compression at the damper assembly 100, the first spring constant of the first coil spring 126 may provide support for damping higher forces received at the wheel 114. The first coil spring 126 and the second coil spring 128 may be coupled together using the spring coupler 138. The spring coupler 138 may be made of, but is not limited to, a polymer based material or a metallic material. The spring coupler 138 may be concentrically disposed about the longitudinal axis X-X' of the damper body 104.

FIG. 2A illustrates a second perspective view of the damper assembly 100 of FIG. 1, in accordance with an embodiment of the disclosure. FIG. 2A is explained in conjunction with elements from FIG. 1. With reference to FIG. 2A, there is shown the damper body 104, the threaded portion 106, and the fluid cylinder 112 as described in FIG. 1.

There is further shown the spring coupler 138 which may be disposed concentrically around the damper body 104. There is further shown the first ring element 148 which may be disposed in the threaded portion 106. The spring coupler 138 may have a passage to concentrically receive the damper body 104 such that the spring coupler 138 may be configured to slide over the first ring element 148 and a second ring element 152 (as shown in FIG. 2B). The spring coupler 138 may include a flanged portion 140 that may be configured to support a pair of dual rate springs that include the first coil spring 126 and the second coil spring 128 as shown in FIG. 1.

FIG. 2B illustrates a sectional side view of the damper assembly of FIG. 2A, in accordance with an embodiment of the disclosure. FIG. 2A is explained in conjunction with elements from FIG. 1 and FIG. 2A. With reference to FIG. 2B, there is shown the damper body 104 and the threaded portion 106 of the damper body 104.

There is further shown the flanged portion 140 which may include a first surface 142 and a second surface 144. The first surface 142 may be configured to support the second end 132 of the first coil spring 126 (shown in FIG. 1) and the second surface 144 may be configured to support the first end 134 of the second coil spring 128 (shown in FIG. 1). In FIG. 2B, there is also shown the first ring element 148 which may be disposed within the first groove 150 of the threaded portion 106 of the damper body 104. The first groove 150 may be machined to hold the first ring element 148. The first groove 150 formed in the threaded portion 106 may extend substantially perpendicular to the longitudinal axis X-X' of the damper body 104. The first ring element 148 may be a snap ring that may be tightly fitted into the first groove 150. The first ring element 148 may be made of a material that may include a high strength steel or high carbon steel. In some embodiments, the first ring element 148 may be shrunk fit into the first groove 150 of the threaded portion 106.

In FIG. 2B, there is further shown a second ring element 152 that may be disposed in a second groove 154 of the threaded portion 106. The second groove 154 formed in the threaded portion 106 may extend substantially perpendicular to the longitudinal axis X-X' of the damper body 104 and may also be machined to hold the second ring element 152. Similar to the first ring element 148, the second ring element 152 may be made of a material that may include a high strength steel or high carbon steel and may be shrunk fit into the second groove 154 of the threaded portion 106. The first groove 150 and the second groove 154 may be spaced apart along the longitudinal axis X-X' and be substantially parallel to each another. The threaded portion 106 may be provided with a plurality of grooves which may include the first groove 150 and the second groove 154. The plurality of grooves may include a plurality of ring elements (for example the first ring element 148 and the second ring element 152).

It may be noted that the two ring elements (for example first ring element 148 and the second ring element 152) shown in FIG. 2B is merely an example. The present disclosure may also be applicable to more number of ring elements, without departure from the scope of the disclosure. Therefore, as shown in FIG. 2B, a third ring element 156 may be disposed in a third groove 158 of the threaded portion 106 and a fourth ring element 160 may be disposed in a fourth groove 162 of the threaded portion 106. In some embodiments, the spring coupler 138 may be configured to slide over at least two ring elements (for example the third ring element 156 and the fourth ring element 160) at a time, as shown in FIG. 2B as example. The multiple ring elements may ensure that the spring coupler 138 remains aligned as well as stays parallel to the damper body 104 when the spring coupler 138 makes transition from one ring element to another (or next) ring element during sliding. Therefore, spacing between two subsequent ring elements may be lesser than a length of the spring coupler 138.

In FIG. 2B, there is further shown a damper piston 166 that may be coaxially disposed within the damper body 104. The damper piston 166 may include a damper shaft 168 configured to translate along the longitudinal axis X-X'. The damper piston 160 and the damper shaft 168 may be made of a material that may include a metal or a metallic alloy. In some embodiments, the material may be, but is not limited to, steel, aluminum or magnesium. The damper shaft 168 may be configured to push or pull hydraulic fluid present within the damper body 104 between a first portion and a second portion of the damper body 104. The forces experienced by the wheel 114 may be transmitted to the damper piston 166 by the damper shaft 168 for damping by the damper assembly 100. Compression of the damper assembly 100 between the lower arm 122 and the vehicle suspension mounting portion 116 dampens forces received on the wheel 114 during movement of the vehicle on different terrains.

As shown in FIG. 2B, there is shown a spring seat 164 that may be provided at the first end 130 of the first coil spring 126. The threaded portion 106 may be configured to receive the spring seat 164. In some embodiments, the spring seat 164 may be configured to adjust a length of the first coil spring 126 and the second coil spring 128. The spring seat 164, received by the threaded portion 106, may be configured to rotate and move upwards or downwards along the longitudinal axis X-X' of the damper body 104. Adjustments in the length of the first coil spring 126 may change the first spring rate of the first coil spring 126 and the second spring rate of the second coil spring 128. The spring seat 164 may be rigidly attached to the damper body 104 using known method such as welding. In some embodiments, the spring seat 164 may be an integral portion provided at the first end 108 of the damper body 104 and may be made of similar materials as that of the damper body 104.

In accordance with an embodiment, another spring seat (not shown) may be provided at the second end 110 of the damper body 104 to support the second end 136 of the second coil spring 128 required for the compression damping. In some embodiments, the first spring rate for the first coil spring 126 may be higher than the second spring rate of the second coil spring 128 shown in FIG. 1. During the compressions of the first coil spring 126 and the second coil spring 128, an inner portion 170 of the spring coupler 138 may come in contact with the first ring element 148, the second ring element 152, the third ring element 156, and the fourth ring element 160 disposed within the first groove 150, the second groove 154, the third groove 158, and the fourth groove 162 of the threaded portion 106, respectively. Due to the presence of the first ring element 148, the second ring element 152, the third ring element 156, and the fourth ring element 160 within the grooves of the damper body, a sliding clearance (for example passage 146) may be provided between the inner portion 170 of the spring coupler 138 and the threaded portion 106. The sliding clearance provided between the inner portion 170 of the spring coupler 138 and the threaded portion 106 prevents contact between the inner portion 170 of the spring coupler 138 and the threaded portion 106 (or the grooves) of the damper body 104. Thus, due to different terrain forces, the spring coupler 138 may not physically contact, rub, or wear the first groove 150, the second groove 154, the third groove 158, and the fourth groove 162 of the threaded portion 106 of the damper body 104, which further avoid undesired damages to the damper body 104. This may further increase the overall life of the damper body and reduces the cost of its replacements over the time. Thus, the presence of the first ring element 148, the second ring element 152, the third ring element 156, and the fourth ring element 160 acts as the mitigation arrangement for the wear of the damper assembly 100.

The first ring element 148, the second ring element 152, the third ring element 156, and the fourth ring element 160 may be made of a resilient material to allow the first ring element 148, the second ring element 152, the third ring element 156, and the fourth ring element 160 to be removable installed in the grooves of the threaded portion 106. Thus, one or more of the first ring element 148, the second ring element 152, the third ring element 156, and the fourth ring element 160 can be replaced or serviced when worn over time depending on their conditions, without a need for the replacement of the complete damper body 104. In some embodiments, an inner diameter of the passage 146 of the spring coupler 138 may be larger than the cross section of the damper body 104 for providing the better sliding clearance. In another embodiment, the inner portion 170 of the spring coupler 138 may be provided with a surface treatment such as electroplating or other surface coating/smoothening techniques for adding a low friction layer. Thus, preventing the spring coupler 138 deformations which may happen due to frequent contacts with any of the first ring element 148, the second ring element 152, the third ring element 156, or the fourth ring element 160.

Figure 3:
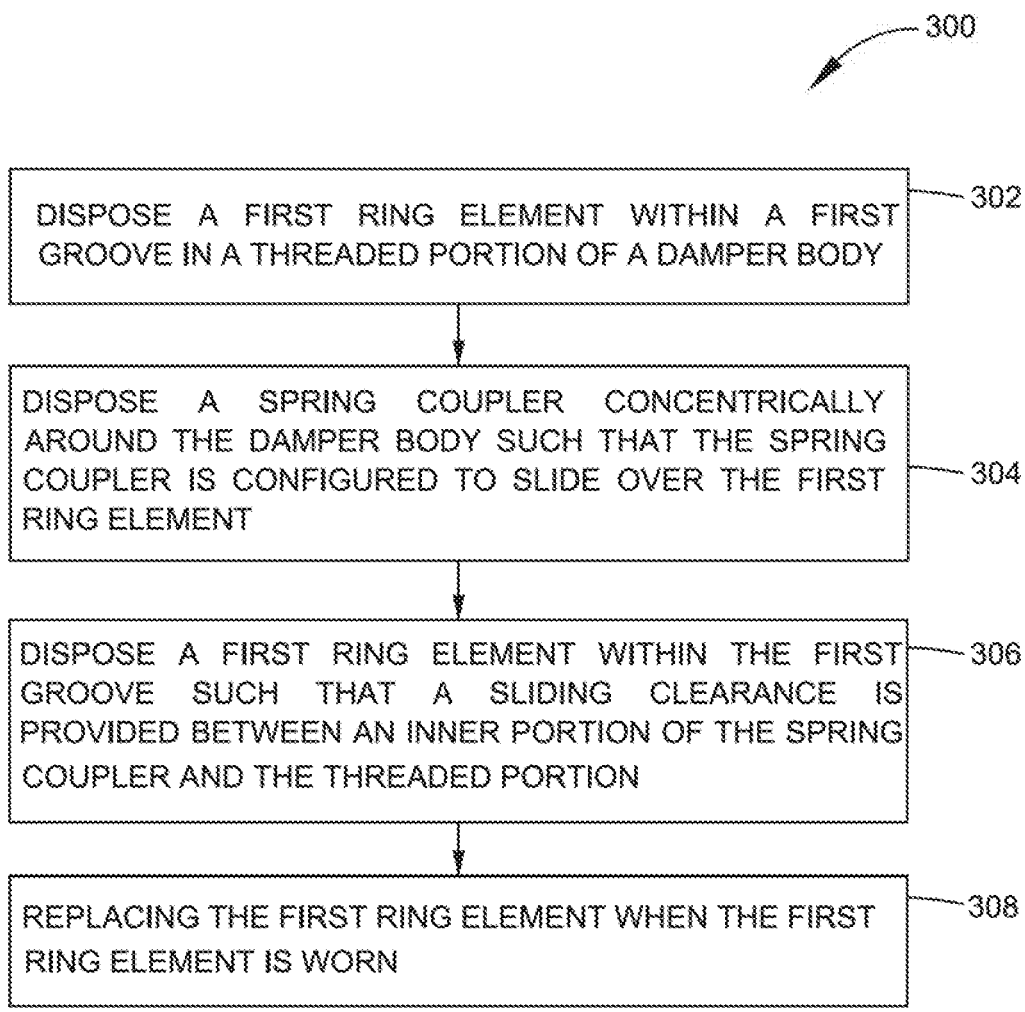
FIG. 3 is a flowchart that illustrates an exemplary method for assembling a damper assembly, in accordance with an embodiment of the disclosure.

FIG. 3 is a flowchart that illustrates an exemplary method for assembling a damper assembly 100, in accordance with an embodiment of the disclosure. FIG. 3 is explained in conjunction with elements from FIG. 1, FIG. 2A, and FIG. 2B. With reference to FIG. 3, there is shown a flowchart 300 that depicts a method of assembling the damper assembly 100. The method performed for assembling the damper assembly 100 may start at 302 and may end at 308.

At 302, a first ring element 148 may be disposed within a first groove 150 in a threaded portion 106 of a damper body 104. The threaded portion 106 may extend between a first end 108 and a second end 110 of the damper body 104.

At 304, a spring coupler 138 may be disposed concentrically around the damper body 104 such that the spring coupler 138 may be configured to slide over the first ring element 148.

At 306, the first ring element 148 may disposed within the first groove 150 such that a sliding clearance (for example the passage 146 in FIG. 2B) may be provided between an inner portion 170 of the spring coupler 138 and the threaded portion 106.

At 308, the first ring element 148 may be replaced when the first ring element is worn. The first ring element 148 may be worn due to frequent contacts with the inner portion 170 of the spring coupler 138. The first ring element 148 may be replaced by use of conventional ring removal or installation tools known in the art.

For the purposes of the present disclosure, expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural. Further, all joinder references (e.g., attached, affixed, coupled, connected, and the like) are only used to aid the reader's understanding of the present disclosure, and may not create limitations, particularly as to the position, orientation, or use of the systems and/or methods disclosed herein. Therefore, joinder references, if any, are to be construed broadly. Moreover, such joinder references do not necessarily infer that two elements are directly connected to each other.

The foregoing description of embodiments and examples has been presented for purposes of illustration and description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent devices by those of ordinary skill in the art. Rather it is hereby intended the scope be defined by the claims appended hereto. Additionally, the features of various implementing embodiments may be combined to form further embodiments.

What is claimed is:

1. A damper assembly for a vehicle, comprising:
   a damper body that comprises a helical rib defining a threaded portion which extends between a first end and a second end of the damper body;
   a first groove extending through a portion of the helical rib in the threaded portion;
   a first ring element disposed within the first groove in the threaded portion; and
   a spring coupler having a passage to concentrically receive the damper body such that the spring coupler is configured to slide over the first ring element,
   wherein the first ring element is disposed within the first groove such that a sliding clearance is provided between an inner portion of the spring coupler and the threaded portion.

2. The damper assembly according to claim 1, wherein the first ring element contacts the inner portion of the spring coupler to prevent the spring coupler from contacting the threaded portion.

3. The damper assembly according to claim 1, wherein the first ring element is made of a resilient material to allow the first ring element to be removably installed in the first groove.

4. The damper assembly according to claim 1, wherein the first groove is formed in the threaded portion to extend perpendicular to a longitudinal axis of the damper body.

5. The damper assembly according to claim 1, further comprising a second groove in the threaded portion, wherein the second groove is spaced apart from the first groove and the second groove is parallel to the first groove.

6. The damper assembly according to claim 5, further comprising a second ring element disposed in the second groove.

7. The damper assembly according to claim 1, wherein the damper body is a substantially cylindrical tube.

8. The damper assembly according to claim 1, wherein the damper body is made of a material that comprises one or more of a metal or a metallic alloy and wherein the material is at least one of steel or aluminum.

9. The damper assembly according to claim 1, wherein the first ring element is a snap ring that is tightly fitted into the first groove.

10. The damper assembly according to claim 1, further comprising a second ring element disposed on the threaded portion and spaced apart from the first ring element along a longitudinal axis of the damper body.

11. The damper assembly according to claim 1, wherein the first ring element is made of a material that comprises steel and the first ring element is shrunk fit into the first groove in the threaded portion.

12. The damper assembly according to claim 1, wherein the spring coupler comprises a flanged portion that is configured to support a pair of dual rate springs that comprises a first coil spring and a second coil spring.

13. A damper assembly for a vehicle, comprising:
 a damper body having a cylindrical external surface and a longitudinal axis;
 a plurality of grooves formed in the cylindrical external surface, the grooves being spaced apart and perpendicular to the longitudinal axis;
 at least one ring element removably disposed in one of the plurality of grooves; and
 a spring coupler having a passage to concentrically receive the damper body, the spring coupler further comprising a flanged portion that is configured to support a first coil spring and a second coil spring,
 wherein the at least one ring element contacts an inner portion of the spring coupler to provide a sliding clearance between the inner portion of the spring coupler and the cylindrical external surface of the damper body.

14. The damper assembly according to claim 13, wherein the at least one ring element contacts the inner portion of the spring coupler to prevent the spring coupler from contacting the cylindrical external surface.

15. The damper assembly according to claim 13, wherein the at least one ring element is made of a resilient material to allow the at least one ring element to be removably installed in one of the plurality of grooves.

16. The damper assembly according to claim 13, wherein each groove of the plurality of grooves is formed through a portion of a helical rib defining a threaded portion in the cylindrical external surface.

17. The damper assembly according to claim 13, wherein the at least one ring element is made of a material that comprises steel and the at least one ring element is shrunk fit into one of the plurality of grooves in the cylindrical external surface.

18. A method for assembling a damper assembly, the method comprising:
 disposing a first ring element within a first groove that extends through a portion of a helical rib defining a threaded portion of a damper body, wherein the threaded portion extends between a first end and a second end of the damper body;
 disposing a spring coupler concentrically around the damper body such that the spring coupler is configured to slide over the first ring element;
 disposing the first ring element within the first groove such that a sliding clearance is provided between an inner portion of the spring coupler and the threaded portion; and
 replacing the first ring element when the first ring element is worn.

19. The method according to claim 18, wherein the first groove extends perpendicular to a longitudinal axis of the damper body.

20. The method according to claim 18, further comprising disposing, concentrically around the damper body, a spring seat between the first end of the damper body and a flanged portion of the spring coupler such that a first coil spring is secured between the flanged portion and the spring seat.

* * * * *